(12) United States Patent
Naito

(10) Patent No.: US 6,552,505 B2
(45) Date of Patent: Apr. 22, 2003

(54) METHOD FOR DRIVING MOTORS AND APPARATUS FOR DRIVING MOTORS

(75) Inventor: Hayato Naito, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 73 days.

(21) Appl. No.: 09/846,113

(22) Filed: Apr. 30, 2001

(65) Prior Publication Data

US 2001/0048277 A1 Dec. 6, 2001

(30) Foreign Application Priority Data

May 10, 2000 (JP) ........................................ 2000-136560

(51) Int. Cl.⁷ .............................. H02P 1/54; H02P 3/00; H02P 5/46; H02P 7/68; H02P 7/74
(52) U.S. Cl. .......................................... 318/63; 318/599
(58) Field of Search .............................. 318/34, 35, 49, 318/53–65, 599

(56) References Cited

U.S. PATENT DOCUMENTS

| | | | | |
|---|---|---|---|---|
| 5,903,112 A | * | 5/1999 | Yamada et al. | ............. 180/65.3 |
| 5,988,307 A | * | 11/1999 | Yamada et al. | .............. 180/243 |
| 6,049,181 A | * | 4/2000 | Kolomeitsev | ................ 318/254 |

* cited by examiner

Primary Examiner—Jeffrey Donels
(74) Attorney, Agent, or Firm—Hogan & Hartson, LLP

(57) ABSTRACT

A method is provided for driving a motor apparatus having a first motor, a second motor, and a motor power supply commonly used for the first motor and the second motor. The first motor is a brushless motor. An electrical power is supplied from the motor power supply to driving circuits of the first motor and the second motor through a common motor power supply line. The first motor is driven by a direct PWM driving method, and the second motor is driven by a method different from the direct PWM driving method. A reverse regeneration current generated in the first motor is flown to the second motor through the common motor power supply line.

14 Claims, 5 Drawing Sheets

(Direct PWM coil current waveform and voltage waveform (for one phase) of 3-phase BL motor)

(Motor current path in section c)

(Motor current path in section b)

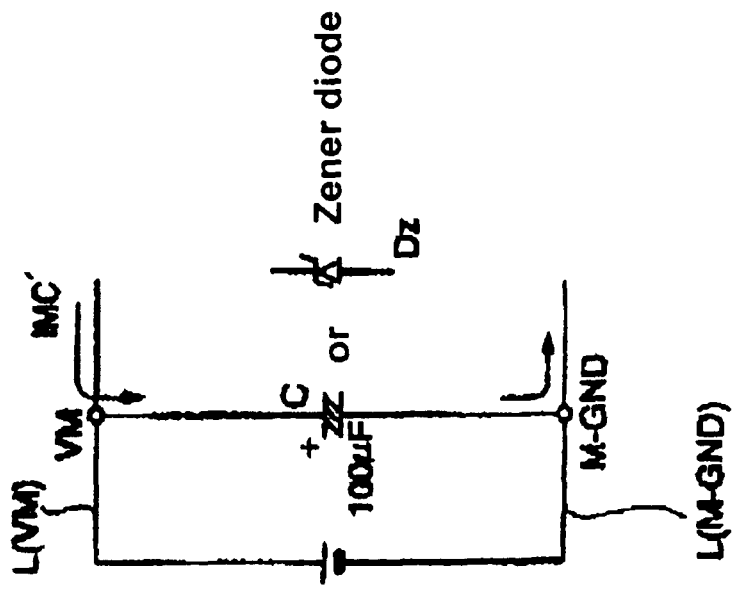
Fig. 5 (b) (Prior Art)
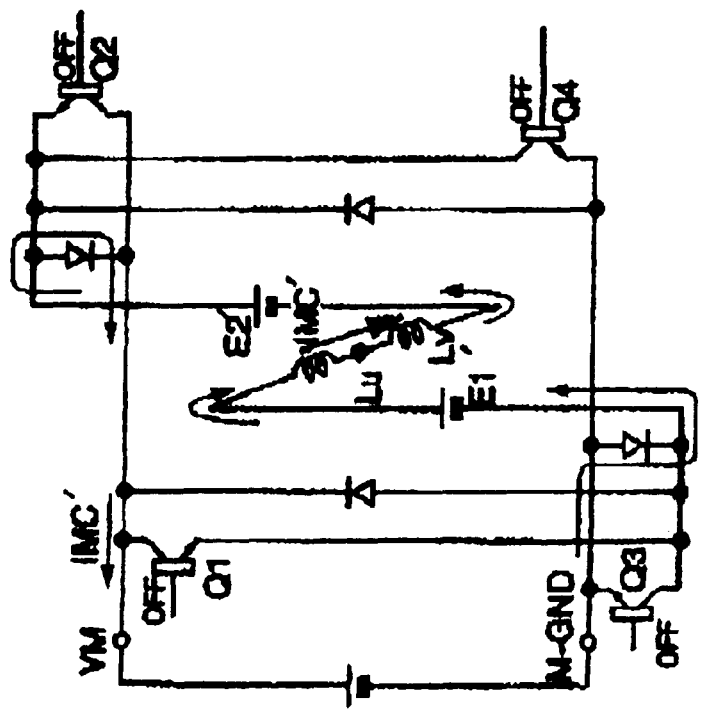
Fig. 5 (a)

METHOD FOR DRIVING MOTORS AND APPARATUS FOR DRIVING MOTORS

BACKGROUND OF THE INVENTION

1. Field of the Invention

The present intention relates to a motor driving method and a motor driving apparatus for driving a plurality of motors to which electrical power is supplied from a common power supply. More particularly, the present invention relates to a motor driving method and a motor driving apparatus for driving motors in which one of the motors is a brushless motor that is driven by a direct PWM driving method, which can securely prevent problems caused by a reverse regeneration current generated in the brushless motor.

2. Related Art

An apparatus may use a plurality of motors. For example, a video recording/reproducing apparatus is equipped with a brushless motor as a capstan motor, a motor with brush for loading and unloading recording media, and a brushless motor for driving a cylinder head. Among the motors, the brushless motor as a capstan motor is generally driven by a direct pulse width modulation (PWM) driving method to reduce the driving power consumption.

In the direct PWM driving method, a power transistor that switches current conducting through a driving coil is turned on and off, for example, by a bi-directional current conduction method, in a cycle shorter than a current conduction switching cycle, such that a regeneration current is flown by a back electromotive force generated by the driving coil during an off period when an external current is shut off, to thereby maintain a driving torque. By driving the brushless motor by the direct PWM driving method, an external current supply is not required while the driving coil generates the regeneration current. As a result, the method is very effective in reducing the energy consumption for driving the motor.

Referring to FIGS. 2 through 4, a conventional direct PWM driving method for driving a brushless motor is described below.

FIGS. 2(a) and 2(b) show a coil current waveform and a coil voltage waveform for one phase in the direct PWM driving method for driving a three-phase brushless motor, respectively. FIGS. 3(a) and 3(b) show the coil current waveform and the coil voltage waveform in detail (for section a shown in FIGS. 2(a) and 2(b)) when a direct PWM current is applied.

Section b in FIGS. 3(a) and 3(b) represents a state in which a power transistor for switching conduction of the drive coil current is turned on, which corresponds to a period during which current is supplied from the motor power supply VM. During this period, the current of the one-phase driving coil increases as indicated by the current waveform in FIG. 3(a) according to the time constant of the coil. In contrast, section c in FIGS. 3(a) and 3(b) represents a state in which the power transistor for switching conduction of the drive coil current is turned off, which corresponds to a period during which the driving coil itself generates a back electromotive force and flows a regeneration current. During this period, the current of the one-phase driving coil decreases according to the time constant of the coil.

FIG. 4(a) shows a motor current (IMb) path that is created when the power transistor for switching conduction of the drive coil current is turned on during section b in FIGS. 3(a) and 3(b). In this state, the motor current flows through a power transistor Q1 on the side of the power supply voltage (VM) to the driving coils Lu and Lv, and returns through a power transistor Q4 on the side of the motor grounding (M-GND) to the motor power supply. The power transistor Q4 on the side of the motor grounding is maintained at an ON state until the conducting current switches to the other phase. On the other hand, the power transistor Q1 on the power supply voltage side is repeatedly turned on and off as shown in FIG. 3.

FIG. 4(b) shows a motor current (IMc) path during section c shown in FIGS. 3(a) and 3(b). In this case, as the power transistor Q1 is turned off, the driving coils generate back electromotive forces E1 and E2, respectively. As a result, a regeneration current IMC flows from the power transistor Q4 through the motor grounding (M-GMD) line to a diode D3 associated with the other power transistor Q3 on the grounding-side. This regeneration current is a motor current that flows through the driving coils.

In the direct PWM driving method described above, a part of the motor current is supplemented by a regeneration current that is generated by the motor itself As a result, the current that may have to be externally supplied can be reduced.

As described above, the motor driving method using the conventional direct PWM driving method is effective in reducing the energy consumption in driving the motor. However, there is a possibility in which the regeneration current does not flow within the driving circuit, but may flow in a reverse direction to the side of the motor power supply (VM).

For example, when the current conducting through the driving coil is switched during the timing shown in FIG. 4(b), and the power transistor Q4 is turned off, a regeneration current IMc' would likely flow in a path indicated in FIG. 5(a) due to back electromotive forces E1' and E2' generated on the respective driving coils. As this moment, if the sinking capability on the side of the motor power supply VM is insufficient, the regeneration current IMc' flowing in a reverse direction cannot go anywhere, such that the motor power supply VM is rapidly elevated as the back electromotive forces E1' and E2' pull up the motor power supply VM. As the motor power supply increases and exceeds the breakdown voltage of the motor driving circuit, the driving circuit would be destroyed. In particular, when the brushless motor is in the reverse rotation brake mode, the PWM off timing shown in FIG. 5(a) becomes longer. As a result, the motor power supply VM would likely elevate, and therefore a dielectric breakdown of the driving circuit would likely occur.

Accordingly, as shown in FIG. 5(b), for example, an electrolytic capacitor C of 100 $\mu$F or greater, a Zener diode Dz of a high current capacity or the like may be added between the motor power supply line L (VM) and the motor grounding line L (M-GND), to absorb the regeneration current IMc' to protect the driving circuit from a dielectric breakdown. However, the addition of such a protection circuit leads to a higher cost.

SUMMARY OF THE INVENTION

It is an object of the present invention to provide a motor driving method and a motor driving apparatus that can avoid problems arising from a reverse regeneration current without adding a protection circuit.

To solve the problems described above, in accordance with one embodiment of the present invention, a method is provided for driving a motor apparatus having a first motor, a second motor, a motor power supply commonly used for the first motor and the second motor, wherein the first motor is a brushless motor. In one aspect of the present invention, an electrical power is supplied from the motor power supply to driving circuits of the first motor and the second motor through a common motor power supply line; the first motor is driven by a direct PWM driving method; the second motor is driven by a method different from the direct PWM driving method; and a reverse regeneration current generated in the first motor is flown to the second motor through the common motor power supply line.

In accordance with the present invention, for example, when a brushless motor of a type that is driven by a direct PWM driving method and a motor of a type that is driven by a normal driving method are present in one system, such as, for example, a video recording and reproducing apparatus, a motor power supply line is commonly used by both of the motors, and a reverse regeneration current generated in the brushless motor driven by the direct PWM driving method is flown in the other motor driven by the normal driving method through the common motor power supply line, such that the reverse regeneration current is absorbed by the motor driven by the normal driving method. As a result, a dielectric breakdown of the motor driving circuit can be prevented.

When the brushless motor driven by the direct PWM driving method, i.e., the first motor undergoes a shift to a reverse brake mode when the second motor is stopped, the second motor that is driven by the normal driving method may preferably be started in synchronism with the shift to the reverse brake mode.

Also, when the brushless motor driven by the direct PWM driving method undergoes the shift to the reverse brake mode while the second motor is operated, the second motor that is driven by the normal driving method is temporarily accelerated in synchronism with the shift to the reverse brake mode.

In the reverse rotation brake mode, a rapid increase in the motor power supply voltage would likely occur. Accordingly, by starting or accelerating the second motor when the first motor is in the reverse rotation brake mode, a reverse regeneration current generated can be effectively consumed as a part of the driving current for the second motor, whereby the reverse regeneration current can be securely absorbed.

In accordance with another embodiment of the present invention, a motor driving apparatus drives a motor by the motor driving method described above. In one aspect of the present invention, a first motor driving circuit that drives the first motor by the direct PWM driving method and a second motor driving circuit that drives the second motor are formed in a common IC chip.

By implementing both of the driving circuits in a common IC chip, their wiring resistance loss is substantially lowered compared to a case in which the driving circuits are formed as discrete circuits on independent substrates. Accordingly, a reverse regeneration current generated can be effectively absorbed on the side of the second motor that is driven by the normal driving method. As a result, an elevation in the driving voltage on the motor power supply line can be suppressed to a minimum value.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 5(a) shows a block diagram that is used to describe the problem caused by a reverse regeneration current that is generated in a conventional direct PWM driving method for driving a three-phase brushless motor.

FIG. 5(b) shows a block diagram of an example of a countermeasure against the reverse regeneration current circuit.

PREFERRED EMBODIMENTS OF THE PRESENT INVENTION

An apparatus for driving motors in accordance with one embodiment of the present invention is described below with reference to the accompanying drawings.

Figure 1:
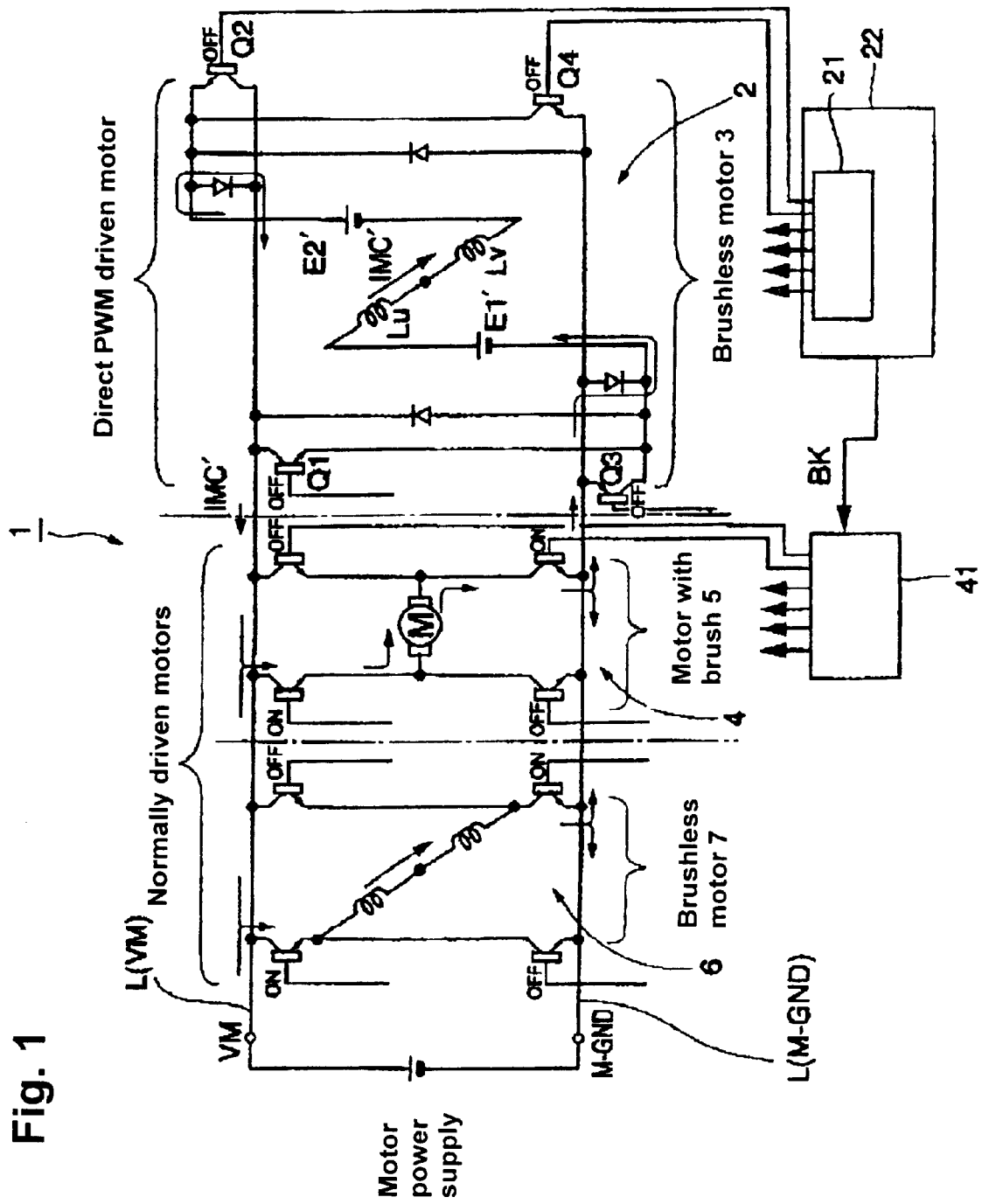
FIG. 1 schematically shows a block diagram of one example of a motor driving apparatus in accordance with the present invention.

FIG. 1 generally shows a block diagram of a main portion of a motor driving apparatus 1 in accordance with one embodiment of the present invention. The motor driving apparatus 1 of the present embodiment has a brushless motor (a first motor) 3 that is equipped with a driving circuit driven by a direct PWM driving method, a motor with brush that is equipped with a driving circuit driven by a normal driving method (a second motor), and a brushless motor 7 (a third motor) that is equipped with a driving circuit 6 driven by a normal driving method. The brushless motor 3 driven by the direct PWM driving method and the brushless motor 7 driven by the normal driving method are both three-phase motors having three-phase driving coils. However, to simplify the illustration, coils that are not in a current conducting state and circuit elements such as power transistors for switching and controlling the current to the coils are omitted.

In the present embodiment, the driving circuits 2, 4 and 6 of the three motors 3, 5 and 7 are driven by driving voltages that are set at the same level, for example, at 24 V. Also, the operation voltage is supplied from a common driving power supply VM. Power supply lines such as a motor power supply line L (VM) and a motor grounding line L (M-GND) are commonly used for the driving circuits. Furthermore, the driving circuits 2, 4 and 6 of the three motors 3, 5 and 7 are implemented in the same IC chip (not shown).

Also, in the motor driving apparatus 1 of the present embodiment, when the brushless motor 3 driven by the direct PWM driving method is switched to a reverse rotation brake mode, a brake signal PK that is indicative of switching the operation mode to the reverse rotation brake mode is outputted to the driving circuit 4 of the motor with brush 5 that is disposed adjacent to the brushless motor 3. When the driving circuit 4 of the motor with brush 5 receives the brake signal BK, and when the motor with brush 5 is being operated, a regeneration current IMc' generated in the brushless motor 3 flows through the common power supply line L (VM) to the driving circuit 4 of the motor with brush 5 or the driving circuit 6 of the brushless motor 7 that is driven by the normal driving method, whereby a part of the regeneration current is used as a driving current in either or both of the motors.

On the other hand, when the driving circuit 4 of the motor with brush 5 receives the brake signal BK while the motor with brush 5 is stopped, the motor 5 is temporarily forcefully started. For example, when the driving circuit 4 of the motor with brush 5 receives the brake signal BK while the motor with brush 5 is stopped, the motor 5 is temporarily forcefully started with the regeneration current generated in the brushless motor 3. In one embodiment, the motor driving apparatus is programmed in the following manner. When the brake signal BK is supplied from a control circuit 22 including a PWM control circuit 21 in the driving circuit 2 of the brushless motor 3 to a control circuit 41 of the driving circuit 4 of the motor with brush 5 when the motor 5 is stopped, the motor 5 is temporarily forcefully started.

Figure 2:
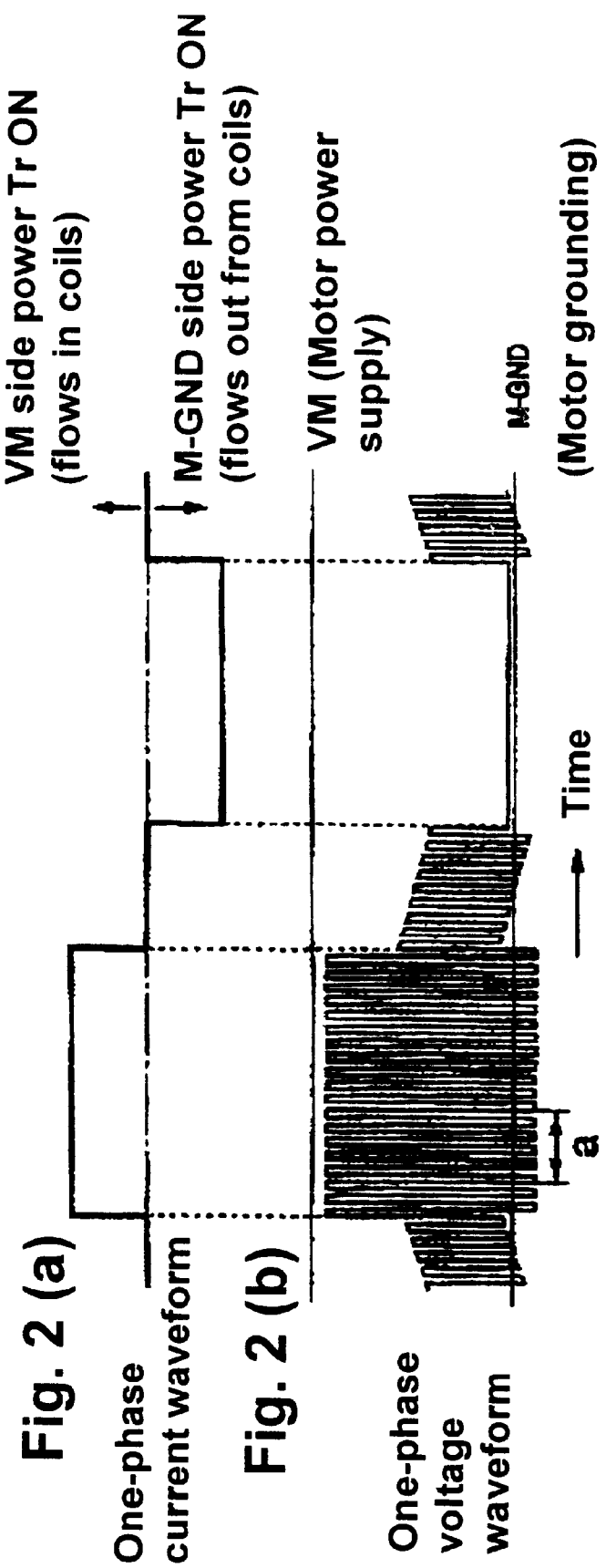
FIGS. 2(a) and 2(b) show a current waveform diagram and a voltage waveform diagram, respectively, that are used to describe a conventional direct PWM driving method for driving a three-phase brushless motor.
Figure 3:
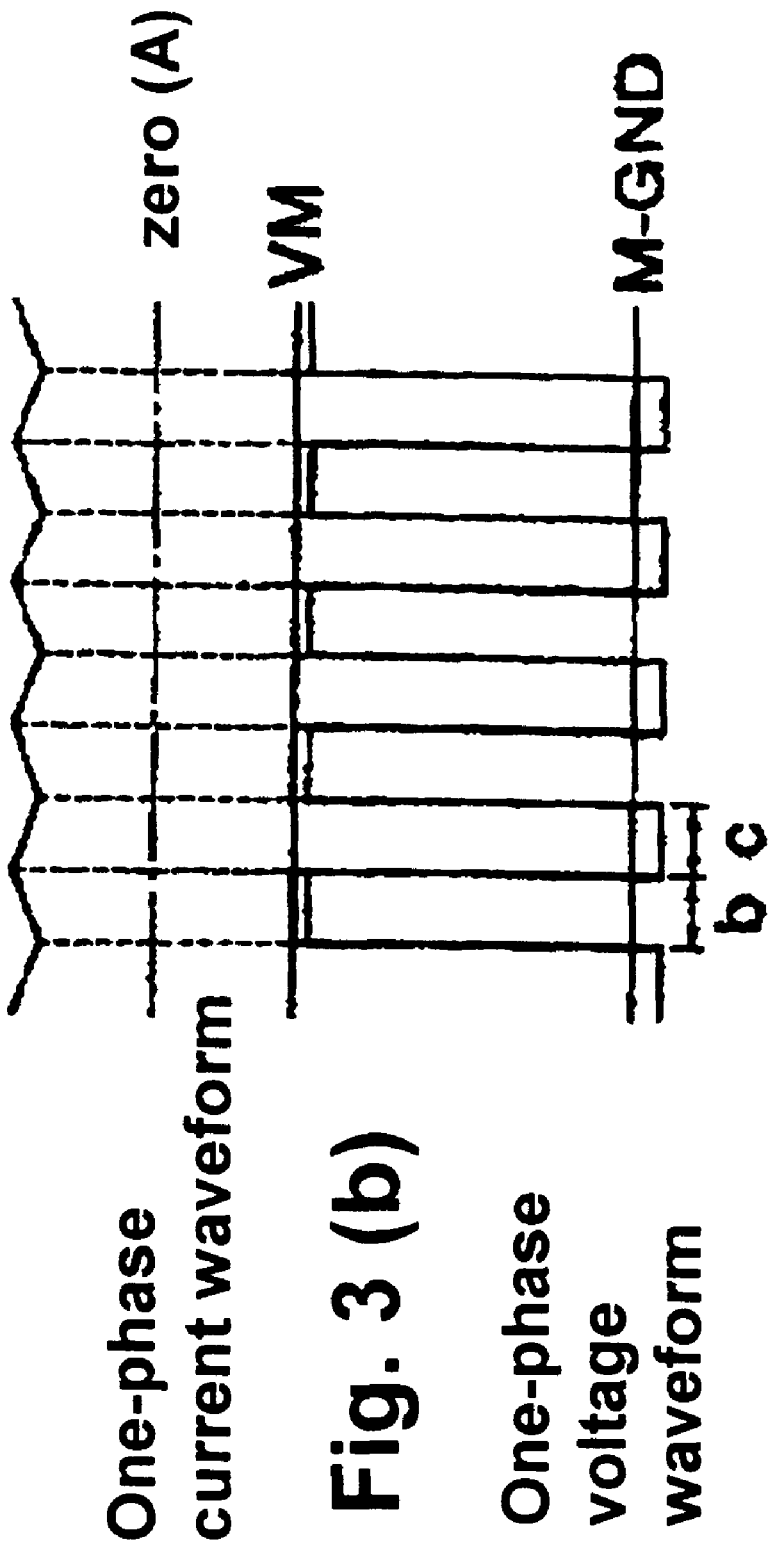
FIGS. 3(a) and 3(b) show enlarged views of a part of the current waveform diagram and a part of the voltage waveform diagram shown in FIGS. 2(a) and 2(b), respectively.
Figure 4:
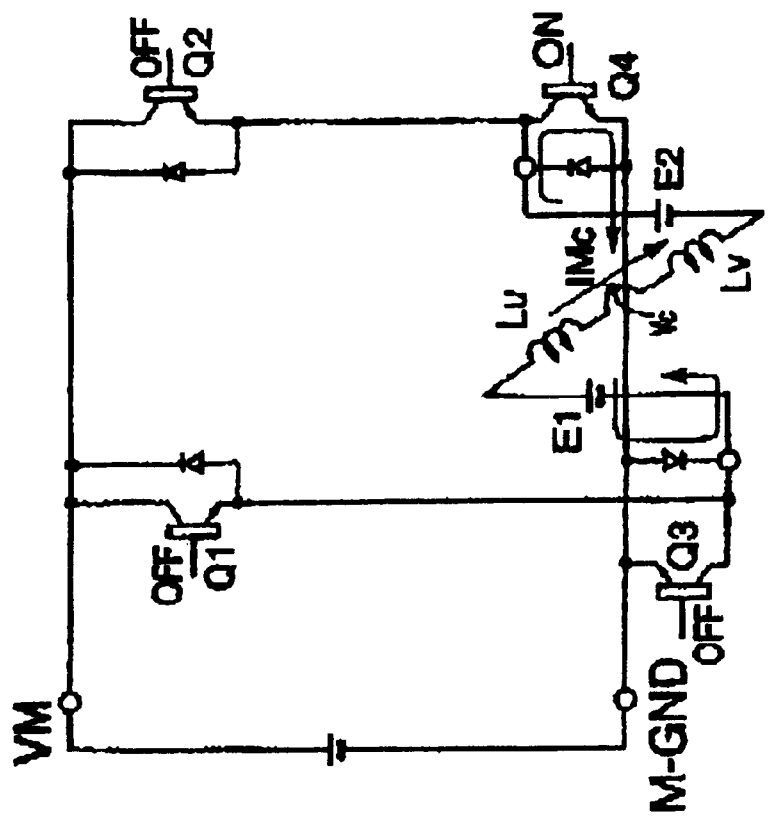
FIGS. 4(a) and 4(b) show block diagrams of equivalent circuits that are used to describe a conventional direct PWM driving method for driving a three-phase brushless motor.
Figure 4:
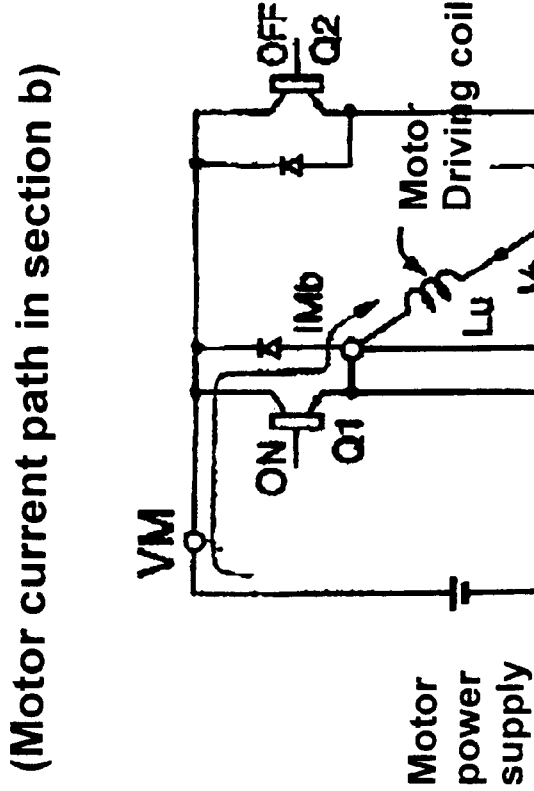

In the motor driving apparatus 1 having the structure described above, the current conduction control for the brushless motor 3 driven by the direct PWM driving method is conducted in a similar manner described above with reference to FIG. 2 through FIG. 4. Namely, at a PWM off timing (the period indicated by c in FIGS. 3(a) and 3(b)), a regeneration current IMC flows due to a back electromotive force of the driving coils as shown in FIG. 4(b).

It is noted that, when the current conducting through the driving coils is switched at the timing shown in FIG. 4(b) while the power transistor Q4 is turned off, a regeneration current IMc' flows through a path indicated in FIG. 1 by back electromotive forces E1' and E2' generated on the driving coils Lu and Lv. In this case, the regeneration current IMc' flows through the common power source line L (VM) and flows in the driving circuit 4 of the adjacent motor with brush 5 and/or the driving circuit 6 of the brushless motor 7 that is driven by the normal driving method. As a result, the regeneration current IMc' is used as a part of the driving current in these motors. In the conventional technique, such a reversing or a back-flowing regeneration current IMc' returns to the motor power supply VM and elevates the power supply voltage of the motor power supply VM to a level exceeding the breakdown voltage of the motor driving circuits 2, 4 and 6. However, in accordance with the present invention, the problem of the conventional technique is prevented.

In the manner described above, in accordance with the present embodiment, in the reverse brake mode having a relatively long PWM off timing, when the motor power supply voltage would be readily elevated by the reversing regeneration current, the adjacent motor 5 is forcefully started to thereby positively absorb the generated reversing regeneration current as a part of the driving current for the motor 5. Therefore, the present embodiment securely prevents the problem in which the reversing regeneration current raises the motor power supply voltage to a level that causes a dielectric breakdown of the motor driving circuits When the motor 5 is being driven, the motor 5 may be temporarily accelerated within a range that does not adversely affect the operation of the motor 5. For example, the motor 5 may be temporarily accelerated with the regeneration current generated in the brushless motor 3. Also, the other brushless motor 7 may be driven and controlled in the same manner as the brushless motor 3. Alternatively, the two motors 5 and 7 may be driven and controlled together.

Furthermore, in accordance with the above-described embodiment, the motor driving apparatus has two motors besides a brushless motor driven by a direct PWM driving method. However, the present invention is also applicable to an embodiment having, for example, one motor or three or more motors besides a brushless motor driven by a direct PWM driving method.

As described above, by the motor driving method in accordance with the present invention, a brushless motor that is driven by a direct PWM driving method and motors driven by a normal driving method uses a common motor power supply line, such that their operation voltage levels are set to the same level. Accordingly, a reverse regeneration current generated in the brushless motor driven by the direct PWM driving method can be absorbed by the motors driven by the normal driving method. As a result, the present invention securely prevents the problem in which the reverse regeneration current raises the motor power supply voltage to a level that causes a dielectric breakdown of the motor driving circuits. Accordingly, dielectric breakdown of the motor driving circuits can be prevented without adding expensive components.

Also, in accordance with the present invention, in a reverse brake mode having a long PWM off timing in which the motor driving voltage is relatively easily raised by the reverse regeneration current, a motor driven by a normal driving method is temporarily forcefully started, or a motor driven by a normal driving method that is being operated is temporarily accelerated. As a result, the reverse regeneration current can be effectively absorbed by the motor driven by the normal driving method.

Furthermore, in the motor driving apparatus of the present invention, motor driving circuits of the motors are implemented in the same IC chip. As a result, wiring resistance loss by a motor power supply line and a motor grounding line that bridge across the driving circuits can be reduced. Accordingly, a reverse regeneration current generated at the side of the brushless motor driven by the direct PWM driving method can be effectively absorbed by other motors driven by the normal driving method, such that the increase in the motor driving voltage can be suppressed to a minimum level.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for driving a motor apparatus having a first motor, at least one second motor, a motor power supply commonly used for the first motor and the second motor, wherein the first motor is a brushless motor, the method comprising:
    supplying electrical power from the motor power supply to driving circuits of the first motor and the second motor through a common motor power supply line;
    driving the first motor by a direct PWM driving method;
    driving the second motor by a method different from the direct PWM driving method; and
    flowing a regeneration current generated in the first motor to the second motor through the common motor power supply line;

wherein the direct PWM driving method comprises:

turning on and off a power transistor for the first motor that switches a current conducting through a driving coil of the first motor for each phase in a cycle shorter than a current conduction switching cycle; and directing the regeneration current caused by a back electromotive force generated by the driving coil of the first motor daring an off-period when the power transistor is turned off to a driving circuit of the second motor.

2. A method for driving a motor apparatus having a first motor, at least one second motor, a motor power supply commonly used for the first motor and the second motor, wherein the first motor is a brushless motor, the method comprising:

supplying electrical power from the motor power supply to driving circuits of the first motor and the second motor through a common motor power supply line;

driving the first motor by a direct PWM driving method;

driving the second motor by a method different from the direct PWM driving method; and flowing a regeneration current generated in the first motor to the second motor through the common motor power supply line;

wherein, when the first motor undergoes a shift to a reverse brake mode when the second motor is stopped, the second motor is started in synchronism with the shift to the reverse brake mode.

3. A method according to claim 2, wherein the driving circuit for the first motor comprises a control circuit including a PWM control circuit, wherein the control circuit supplies a signal for the reverse brake mode to a control circuit of the driving circuit of the second motor when the first motor undergoes the shift to the reverse brake mode.

4. A method according to claim 2, wherein the second motor is temporarily started when the first motor undergoes the shift to the reverse brake mode.

5. A method according to claim 2, wherein, when the first motor undergoes the shift to the reverse brake mode while the second motor is operated, the second motor is temporarily accelerated in synchronism with the shift to the reverse brake mode.

6. A method according to claim 1, wherein the driving circuits of the first and second motors use a common motor grounding line, and the driving circuits of the first and second motors are operated at an identical operation voltage level.

7. A motor driving apparatus for driving motors by the method according to claim 2, the motor comprising:

a first motor driving circuit that drives the first motor by the direct PWM driving method and a second motor driving circuit that drives the second motor are implemented in a common IC chip.

8. A motor driving apparatus for driving a first motor and at least one second motor wherein the first motor is a brushless motor, the motor driving apparatus comprising:

a motor power supply commonly used for the first motor and the at least one second motor;

a first motor driving circuit that drives the first motor by a direct PWM driving method;

a second motor driving circuit that drives the at least one second motor by a driving method different from the direct PWM driving method; and a control circuit that directs a regeneration current generated in the first motor to the second motor driving circuit through the common motor power supply line;

wherein the control circuit directs the regeneration current generated in the first motor during an off-period when a power transistor for the first motor is turned off.

9. A motor driving apparatus for driving a first motor and at least one second motor wherein the first motor is a brushless motor, the motor driving apparatus comprising:

a motor power supply commonly used for the first motor and the at least one second motor;

a first motor driving circuit that drives the first motor by a direct PWM driving method;

a second motor driving circuit that drives the at least one second motor by a driving method different from the direct PWM driving method; and a control circuit that directs a regeneration current generated in the first motor to the second motor driving circuit through the common motor power supply line;

wherein, when the first motor undergoes a shift to a reverse brake mode while the second motor is stopped, the control device forcefully starts the second motor in synchronism with the shift to the reverse brake mode.

10. A motor driving apparatus according to claim 9, wherein the first motor driving circuit for the first motor supplies a signal representative of the reverse brake mode to the second motor driving circuit when the first motor undergoes the shift to the reverse brake mode.

11. A motor driving apparatus according to claim 9, wherein the second motor is temporarily started when the first motor undergoes the shift to the reverse brake mode.

12. A motor driving apparatus according to claim 9, wherein, when the first motor undergoes the shift to the reverse brake mode while the second motor is operated, the control device temporarily accelerates the second motor in synchronism with the shift to the reverse brake mode.

13. A motor driving apparatus according to claim 9, wherein the first motor driving circuits and the second motor driving circuit use a common motor grounding line, and are operated at an identical operation voltage level.

14. A motor driving apparatus for driving motors by the method according to claim 2, the motor comprising:

a first motor driving circuit that drives the first motor by the direct PWM driving method and a second motor driving circuit that drives the second motor are implemented in a common IC chip.

* * * * *